Dec. 26, 1967     K. BEDROSIAN     3,360,380
METHOD OF STORING BANANAS
Filed April 20, 1964
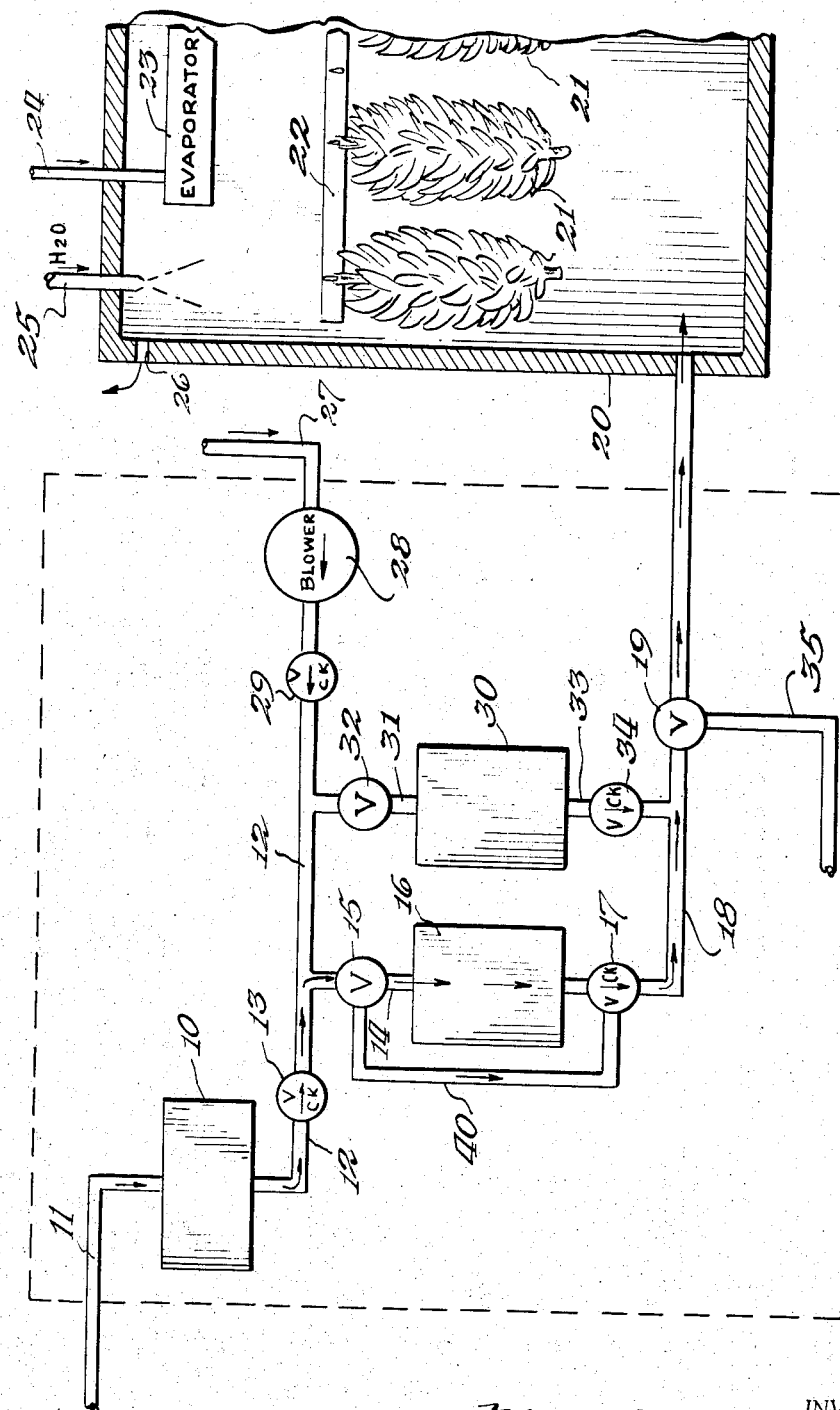
INVENTOR.
Kavakian Bedrosian
BY
Hofgren, Wegner, Allen, Stellman & McCord
Attorneys 3,360,380
METHOD OF STORING BANANAS
Karakian Bedrosian, St. Joseph, Mich., assignor to Whirlpool Corporation, a corporation of Delaware
Filed Apr. 20, 1964, Ser. No. 360,918
4 Claims. (Cl. 99—154)

ABSTRACT OF THE DISCLOSURE

A method of storing harvested bananas in a controlled atmosphere containing oxygen in an amount less than that found in normal air and removing the unsaturated hydrocarbon gases that are given off naturally by the bananas during their storage with the removing being at a rate such as to limit the maximum unsaturated hydrocarbon gas in the atmosphere contacting the bananas to a safe level that is dependent upon the amount of oxygen in the atmosphere, the preferred maximum amount of unsaturated gas in the atmosphere being about 0.5 part of the gas per million parts of atmosphere.

---

This invention relates to a method of storing harvested bananas thereby allowing the bananas to be harvested nearer full maturity than heretofore thought possible and with greatly reduced damage to the stored bananas due at least in part to the natural ripening process during the storage period.

Bananas are grown only in those countries covered by a belt extending from about 30° north latitude to about 30° south altitude. The major banana consuming areas are, of course, north of this belt or zone. It is, therefore, necessary that the harvested bananas be shipped considerable distances to the consuming areas. Stored harvested bananas are very susceptible to decay in transit, particularly for the distances required to ship the bananas to the European markets.

One of the features of this invention is to provide an improved method of storing harvested bananas such as during shipment from the growing regions to the consuming areas that has the advantages of (1) greatly reducing banana ripening and decay during storage, (2) permitting harvesting of the bananas at a more mature state than heretofore possible, and (3) greatly reducing the loss in weight of the stored bananas during the storage period.

Other features and advantages of the invention will be apparent from the following description of the invention.

In the prior patent of Bedrosian et al. 3,120,777, assigned to the same assignee as the present application, there is disclosed and claimed a method of preserving animal and plant materials by controlling the atmosphere in which the materials are stored. Stored harvested animal and plant materials respirate according to the following approximate respiratory change equation which is described in the above Bedrosian patent:

$$nO_2 + (CH_2O)_n \rightarrow nCO_2 + nH_2O$$

This equation expresses the chemical reactions involved in a simplified manner. The $(CH_2O)_n$ represents a carbohydrate molecule that is destroyed during the degradation or deterioration process during storage by consuming oxygen and giving off carbon dioxide and water. As is pointed out in the above patent, this degradation equation can be slowed considerably so that the materials can be stored for much longer periods of time by decreasing the amount of oxygen from that found in normal air and increasing the amount of carbon dioxide from that found in normal air in the storage atmosphere. This reduces the progress of the equation in the direction illustrated, so that destruction of the molecules of the stored materials is very greatly reduced thereby increasing considerably the storage period.

Bananas represent a different storage problem that in many instances is much more severe than that for animal and plant materials generally. The reasons for this are as follows:

Stored bananas give off large quantities of unsaturated hydrocarbon gases which are primarily ethylene. This ethylene, particularly in the presence of oxygen, is very destructive to stored bananas as it causes rapid aging and decay. In fact, this principle of introducing ethylene into the storage atmosphere is used, under controlled conditions, to ripen bananas during storage. To further complicate the problem the presence of ethylene and other unsaturated hydrocarbon gases in the storage atmosphere contacting the stored bananas increases the production of these gases by the bananas themselves, thereby creating a cumulative effect.

The rate of ethylene production by the bananas can be reduced by lowering the storage temperature. This, however, is complicated by the fact that bananas are very susceptible to chilling damage so that the temperature of the stored banana can not be lowered much below 55° F. except for very short periods of time. Therefore, the bananas must be kept at fairly high temperatures where the bananas produce large quantities of ethylene and other unsaturated hydrocarbon gases, which in turn promotes the production by the bananas of still large quantities of more such gases, all of which are very destructive to the stored bananas, particularly in the presence of oxygen which of course is always present in the storage atmosphere. Attempts have been made to store bananas in hermetically sealed containers, but this has not been found practicable or desirable, for ethylene accumulates under these conditions.

At present the bananas must be harvested green and at only a fraction of the full size and weight which they would have reached if allowed to ripen on the trees. This is done so that they will not reach a ripened condition by the end of the storage period. Thus, it is customary now to harvest the bananas at 85–90% of their full tree ripened size and weight when shipped to the U.S. market from the western hemisphere and at only 65% of their full tree ripened size and weight when shipped to the European market. Storage of harvested bananas under the conditions of this invention permits harvesting the bananas at as much as 95% of their full tree ripened size and weight for shipment either to the United States or the European market from the western hemisphere banana growing areas.

Another difficulty in storing harvested bananas such as in shipping from the harvesting areas to the consuming areas is that bananas during shipment lose weight due to dehydration. The loss in weight of the stored bananas during the storage period can be reduced by increasing the humidity of the storage atmosphere. However, this humidity cannot ordinarily be above about 85% relative humidity without promoting mold growth. This mold is not only destructive to the stored bananas but certain types of molds themselves produce unsaturated hydrocarbon gases including ethylene which thereby further raises the concentration of these gases in the storage atmosphere with the above described increased destructive activity.

By the methods of this invention, however, the relative humidity in the storage atmosphere can now be raised to as much as 90–95% without excessive mold growth. This means that by using the controlled atmosphere storage of this invention not only can the bananas be harvested nearer to tree ripened maturity but the relative humidity of the storage atmosphere can be greatly increased so as to reduce considerably weight losses of the bananas during the storage period.

As stated previously, degradation and deterioration of the stored harvested bananas proceeds according to the above respiratory change equation in that the bananas consume oxygen and give off carbon dioxide. In addition, the stored bananas produce unsaturated hydrocarbon gases including ethylene. Not only can this respiratory change equation be slowed down considerably, as described in the above Bedrosian et al. patent, to extend the storage period without excessive banana destruction but also the production of ethylene and other unsaturated hydrocarbon gases is greatly reduced. In general, the oxygen content of this storage atmosphere will be controlled to approximately 1-10% by volume of the atmosphere and the carbon dioxide is maintained at about 0.5-6 times the amount by volume of oxygen. In general, this amount of carbon dioxide will be about 1-15% by volume of the atmosphere. In addition, unsaturated gases such as ethylene that are produced during the storage period are removed by the method of this invention to keep the concentration of these unsaturated gases at a safe level for the oxygen concentration. Thus, the storing of the harvested bananas in the atmosphere of this invention has the following advantages:

The respiration rate of the stored bananas is reduced so as to increase the storage life and reduce the amount of unsaturated hydrocarbon gases produced by the bananas. In addition, the stored bananas can now tolerate larger amounts of ethylene and other unsaturated gases as the destructive action of these gases appears to be the result of a combined action of the ethylene with oxygen. Thus, in an atmosphere of 1% by volume of oxygen the bananas can stand a concentration of 0.5 p.p.m. of ethylene. However, at 21% by volume of oxygen, for example, the bananas can only tolerate a concentration of 0.1 p.p.m. by volume of ethylene. As a practical matter, even with the atmosphere of this invention, the ethylene content is limited to a maximum of about 0.5 p.p.m. by volume of the atmosphere.

In any event, maximum storage efficiency is obtained by reducing the amount of oxygen along with reducing the amount of unsaturated hydrocarbon gases, specifically ethylene.

With the controlled atmosphere of this invention the bananas can be harvested at as much as 95% full size and weight upon being shipped instead of the 65-90% of full size and weight now required.

In addition, the relative humidity of the storage atmosphere can be maintained at as much as 95% to reduce greatly losses in weight due to dehydration. Under present storage conditions the relative humidity cannot be much above 85%. This increased humidity can be maintained without destructive mold growth which, as pointed out above, not only damages the bananas by mold action but also produces ethylene in certain instances to add to the ethylene problem.

Under the preferred conditions of this invention the storage temperature of the bananas is preferably maintained at about 55-65° F. The preferred oxygen content in the storage atmosphere is about 1.5-3.5% by volume and the amount of carbon dioxide is preferably about 1-8% by volume. The humidity in the atmosphere is preferably up to about 95% with the humidity being kept as high as possible to reduce the dehydration and weight losses. In addition, this invention requires that ethylene be removed from the storage atmosphere so as to limit the maximum content in the atmosphere contacting the bananas to not more than about 0.5 p.p.m. of ethylene or other unsaturated hydrocarbon gases. This removal of ethylene and similar gases must be continuous as bananas in storage customarily produce about 4 microliters of unsaturated hydrocarbon gases, primarily, ethylene, per kilogram of bananas per hour at the storage temperature of about 55-65° F.

In the single figure of the accompanying drawing there is provided a semi-diagrammatic view partially in section of one embodiment of an apparatus for practicing the invention in which the storage atmosphere is produced and conducted to the storage chamber or room and the ethylene and other hydrocarbon gases are removed so as to maintain a safe level. As mentioned earlier, this safe level because of the nature of the storage atmosphere is much higher than was heretofore thought possible.

The apparatus shown in the accompanying drawing includes a catalytic burner 10 of the type disclosed in Bedrosian et al. Patent 3,102,778, also assigned to the same assignee as the present application. This catalytic burner 10 is supplied with a fuel gas and air mixture by a pipe 11 and the gas is burned in the burner 10 at a reduced temperature due to the presence of a catalyst bed (not shown) of the type disclosed in the above Patent 3,102,778.

In the burner 10 the products of combustion include carbon dioxide and inert gases from air, primarily nitrogen.

From the burner 10 these gaseous products are conducted by way of a pipe 12 and a check valve 13 into a branch pipe 14 controlled by a valve 15 and from the pipe 14 into an adsorber 16 containing activated carbon for adsorbing excess carbon dioxide.

From the adsorber 16 the gases flow by way of a check valve 17, pipe 18 and valve 19 to a storage chamber or room 20 in which the bananas 21 are stored as by suspending them from a rack 22. While bananas 21 are shown as being stored in stems, it is, of course, obvious that the bananas may be stored in trays, in boxes, or in any other desirable manner.

The atmosphere in contact with the bananas may be refrigerated, where required, by means of a typical refrigerant evaporator 23 supplied with liquid refrigerant in the normal manner by a pipe 24. The humidity to the atmosphere within the chamber 20 is controlled by supplying water into the atmosphere through a pipe 25.

The gaseous atmosphere within the chamber 20 in this embodiment is vented to the outside through a vent opening indicated at 26 so that the unsaturated hydrocarbon gases are kept low by flushing them from the chamber 20. In actual practice the venting would be done through a plurality of openings but these are illustrated diagrammatically by the single opening 26.

In order to remove the adsorbed gases from the activated charcoal (not shown) in the adsorber 16, there is provided an air supply through a pipe 27 to the ambient atmosphere with this air being drawn in by a blower 28. This blower exhausts into the pipe 12 by way of a check valve 29.

If desired, gases from the burner 10 may bypass the adsorber by way of pipe 40 so as to flow at full carbon dioxide concentration into the storage room 20. This bypass may also be used to convey air from the blower 28 to the room 20.

In order to provide a supply of carbon dioxide reduced atmosphere even when one adsorber is saturated with adsorbed gases, there is provided a second adsorber 30 in parallel with adsorber 16 and communicating with pipe 12 through its own pipe 31 and valve 32. Gases from the adsorber 30 flow into the pipe 18 by way of pipe 33 and check valve 34. The air and removed gases from the adsorbers 16 and 30 are exhausted out the pipe 35 by way of valve 19. Thus, the saturated adsorber may be regenerated when the burner 10 is not operating by air from the blower 28 directed through the saturated adsorber and out the pipe 35 by proper manipulation of the valves 15, 17, 32, 34 and 19.

The dual adsorber bed system for generating the storage atmosphere which is shown here only diagrammatically is disclosed more fully and claimed in the copending application of Thomas et al. Serial No. 321,626, filed Nov. 5, 1963. The catalytic burner 10 is preferably of the dual bed type shown in detail and claimed in the copending application of R. I. Ranum Serial No. 321,918, filed Nov. 6, 1963, both applications being assigned to the same assignee as the present application.

It was found that the desired amount of ethylene and other unsaturated hydrocarbon gases in the atmosphere could be maintained by venting the atmosphere from the storage chamber and supplying fresh atmosphere from the generating system, as illustrated in this embodiment. Other means of removing the unsaturated hydrocarbon gases may of course be used. Where the unsaturated hydrocarbon gas level is maintained by venting, the atmosphere within the chamber 20, and contacting bananas 21, is replaced or changes with about 3–12 atmosphere changes per 24-hour day. In some instances this can be reduced to 0.5 changes per day.

In one embodiment of the invention the bananas were stored in an atmosphere containing about 5% by volume of carbon dioxide and 2.5% by volume of oxygen with the remainder being made up of the inert gases found in air. The relative humidity in the atmosphere was maintained at about 90% and the temperature was maintained at about 60° F. The atmosphere within the chamber contacting the bananas was changed 8 times per day so that the maximum unsaturated hydrocarbon gas (primarily ethylene) was limited to not more than 0.5 part per million. Under these conditions the bananas were stored for several weeks without excessive spoilage.

Having described my invention as related to the embodiment set out herein, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. The method of storing harvested bananas for a storage period during which said bananas consume oxygen and give off unsaturated hydrocarbon gases including ethylene having a ripening and destructive effect on said bananas during storage, comprising: subjecting said bananas to an atmosphere containing oxygen, the amount of oxygen being less than that found in normal air, whereby said atmosphere tends to become contaminated with said hydrocarbon gases; and removing said unsaturated hydrocarbon gases at such a rate as to limit the maximum unsaturated hydrocarbon gas in said atmosphere contacting said bananas to a safe level of about 0.5 p.p.m. maximum dependent upon the amount of oxygen in said atmosphere.

2. The method of storing harvested bananas for a storage period during which said bananas consume oxygen and give off carbon dioxide and unsaturated hydrocarbon gases including ethylene having a ripening and destructive effect on said bananas during storage, comprising: subjecting said bananas to an atomsphere containing oxygen and carbon dioxide, the amount of oxygen being less than that found in normal air and the amount of carbon dioxide being greater than that found in normal air, whereby said atmosphere tends to become contaminated with said hydrocarbon gases; and removing said unsaturated hydrocarbon gases at such a rate as to limit the maximum unsaturated hydrocarbon gas in said atmosphere contacting said bananas to a safe level of about 0.5 p.p.m. maximum dependent upon the amount of oxygen in said atmosphere.

3. The method of storing harvested bananas for a storage period during which said bananas consume oxygen and give off carbon dioxide and unsaturated hydrocarbon gases including ethylene having a destructive effect on said bananas during storage, comprising: contacting said bananas with an atmosphere containing about 1–10% by volume of oxygen, about 1–15% by volume of carbon dioxide and the remainder inert gases, and having a relative humidity up to about 95% and a temperature of about 55–65° F.; and removing said unsaturated hydrocarbon gases at such a rate as to limit the maximum unsaturated hydrocarbon gas in said atmosphere contacting said bananas to about 0.5 part of unsaturated gas per million parts of atmosphere.

4. The method of storing harvested bananas for a storage period during which said bananas consume oxygen and give off carbon dioxide and unsaturated hydrocarbon gases including ethylene having a destructive effect on said bananas during storage, comprising: contacting said bananas with an atmosphere containing about 1.5–3.5% by volume of oxygen, about 5% by volume of carbon dioxide and the remainder inert gases, and having a relative humidity of about 85–95% and a temperature of about 55–65° F.; and removing said unsaturated hydrocarbon gases at such a rate as to limit the maximum unsaturated hydrocarbon gas in said atmosphere contacting said bananas to about 0.5 part of unsaturated gas per million parts of atmosphere.

References Cited
UNITED STATES PATENTS

| | | | |
|---|---|---|---|
| 3,102,777 | 9/1963 | Bedrosian et al. | 99—154 |
| 3,102,780 | 9/1963 | Bedrosian et al. | 99—154 |

HYMAN LORD, *Primary Examiner.*

A. LOUIS MONACELL, *Examiner.*

M. VOET, *Assistant Examiner.*